US012804060B1

(12) United States Patent
Yenusah et al.

(10) Patent No.: US 12,804,060 B1
(45) Date of Patent: Nov. 17, 2026

(54) AUTOMATED AND OPTIMIZED DATA FRAME GENERATION

(71) Applicant: Schlumberger Technology Corporation, Sugar Land, TX (US)

(72) Inventors: Caleb Yenusah, Menlo Park, CA (US); Rodney William Lessard, Menlo Park, CA (US); Nazar Ivankiv, Abu Dhabi (AE); Aleksei Kudriavtsev, Clamart (FR); Arnaud Croux, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/218,697

(22) Filed: May 27, 2025

(51) Int. Cl.

| | |
|---|---|
| ***H04L 69/324*** | (2022.01) |
| ***E21B 45/00*** | (2006.01) |
| ***E21B 47/12*** | (2012.01) |
| ***G06F 17/11*** | (2006.01) |

(52) U.S. Cl.
CPC ............ *H04L 69/324* (2013.01); *E21B 45/00* (2013.01); *E21B 47/12* (2013.01); *G06F 17/11* (2013.01)

(58) Field of Classification Search
CPC ....... H04L 69/324; E21B 45/00; E21B 47/12; E21B 47/125; E21B 47/13; E21B 47/138; E21B 47/14; E21B 47/18; E21B 47/20; E21B 47/22; E21B 47/24; G06F 17/11
See application file for complete search history.

(56) References Cited

U.S. PATENT DOCUMENTS

| | | | | |
|---|---|---|---|---|
| 8,044,821 | B2 * | 10/2011 | Mehta | G01V 11/002 340/855.5 |
| 8,060,311 | B2 * | 11/2011 | Ramshaw | E21B 44/00 73/152.55 |
| 11,066,928 | B2 * | 7/2021 | Raveloson | E21B 47/12 |

* cited by examiner

*Primary Examiner* — Franklin D Balseca
(74) *Attorney, Agent, or Firm* — Jeffrey D. Frantz

(57) ABSTRACT

A method for generating a data frame includes building a mathematical model of a data frame generating problem that is constrained by data placement rules and solving the mathematical model by iterating a range of spacings of a frequency rule to generate a data frame that satisfies each of the data placement rules.

17 Claims, 5 Drawing Sheets

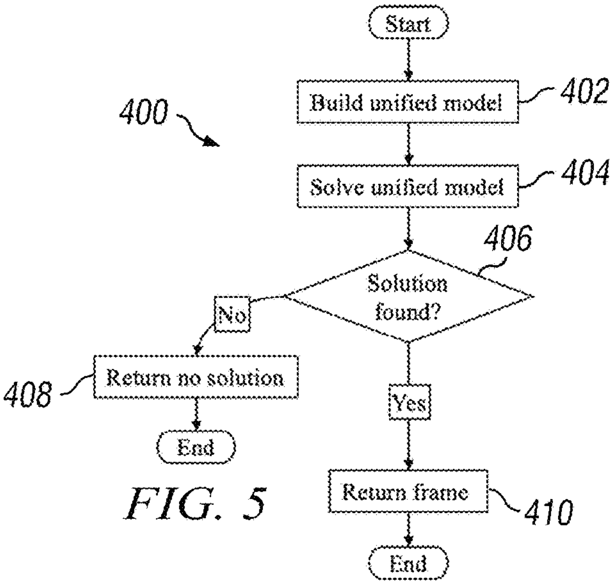

*FIG. 5*

Data point information:

| Name | Size | Class |
|---|---|---|
| $d_1$ | 5 | $c_1$ |
| $d_2$ | 3 | $c_2$ |
| $d_3$ | 5 | $c_1$ |
| $d_4$ | 6 | $c_1$ |
| $d_5$ | 2 | $c_3$ |
| $d_6$ | 4 | $c_3$ |
| $d_7$ | 2 | $c_2$ |
| $d_8$ | 3 | $c_3$ |
| $d_9$ | 2 | $c_2$ |
| $d_{10}$ | 2 | $c_1$ |
| $d_{11}$ | 4 | $c_2$ |
| $d_{12}$ | 2 | $c_3$ |
| $d_{13}$ | 2 | $c_2$ |
| $d_{14}$ | 3 | $c_2$ |
| $d_{15}$ | 2 | $c_1$ |
| $d_{16}$ | 2 | $c_1$ |

Data placement rules:

1. Top rule:
   $T = [d_{16}, d_{13}]$
2. Bottom rule:
   $B = [d_{14}, d_{10}]$
3. Ordered group rule:
   $G_1 = [d_5, d_7]$
4. Ordering rule:
   $O_1 = [d_{15}, d_3, d_{12}]$
5. Separation rule:
   $S_1 = (d_4, d_9, 28 \pm 2)$
   $S_2 = (d_{11}, d_3, 10 \pm 2)$
6. Frequency rule:
   $F_1 = (d_5, 18 \pm 4)$
   $F_2 = (d_7, 18 \pm 4)$
   $F_3 = (d_8, 27 \pm 3)$
7. Class rule:
   $W_{max,1} = 7$ Valid data frame:

| Index | Name ($d_i$) | Size ($s_i$) | Frequency Spacing | Class ($c_i$) | Starting Position ($x_i$) |
|---|---|---|---|---|---|
| 0 | $d_{16}$ | 2 | | $c_1$ | 0 |
| 1 | $d_{13}$ | 2 | | $c_2$ | 2 |
| 2 | $d_8$ | 3 | 24 | $c_3$ | 4 |
| 3 | *filler* | 1 | 15 | $c_1$ | 7 |
| 4 | $d_5$ | 2 | 15 | $c_3$ | 8 |
| 5 | $d_7$ | 2 | 15 | $c_2$ | 10 |
| 6 | $d_4$ | 6 | | $c_1$ | 12 |
| 7 | $d_6$ | 4 | | $c_3$ | 18 |
| 8 | *filler* | 1 | 5 | $c_1$ | 22 |
| 9 | $d_5$ | 2 | 18 | $c_3$ | 23 |
| 10 | $d_7$ | 2 | 18 | $c_2$ | 25 |
| 11 | *filler* | 1 | 18 | $c_1$ | 27 |
| 12 | $d_8$ | 3 | 24 | $c_3$ | 28 |
| 13 | $d_2$ | 3 | | $c_2$ | 31 |
| 14 | $d_1$ | 5 | | $c_1$ | 34 |
| 15 | $d_9$ | 2 | | $c_2$ | 39 |
| 16 | $d_5$ | 2 | 21 | $c_3$ | 41 |
| 17 | $d_7$ | 2 | 21 | $c_2$ | 43 |
| 18 | *filler* | 1 | 21 | $c_1$ | 45 |
| 19 | $d_{11}$ | 4 | | $c_2$ | 46 |
| 20 | $d_{15}$ | 2 | | $c_1$ | 50 |
| 21 | $d_8$ | 3 | 24 | $c_3$ | 52 |
| 22 | $d_3$ | 5 | | $c_1$ | 55 |
| 23 | $d_{12}$ | 2 | | $c_3$ | 60 |
| 24 | $d_5$ | 2 | 18 | $c_3$ | 62 |
| 25 | $d_7$ | 2 | 18 | $c_2$ | 64 |
| 26 | *filler* | 1 | 13 | $c_1$ | 66 |
| 27 | $d_{14}$ | 3 | | $c_2$ | 67 |
| 28 | $d_{10}$ | 2 | | $c_1$ | 70 |

*FIG. 6*

AUTOMATED AND OPTIMIZED DATA FRAME GENERATION

FIELD

Disclosed embodiments relate generally to data frame generation for electronic communication and more particularly to data frame generation for downhole measurement while drilling applications.

BACKGROUND

Measurement while drilling (MWD) and logging while drilling (LWD) systems are widely used in downhole drilling operations in the oil and gas industry. Such measurement systems provide real-time insights into borehole conditions, formation properties, and drilling parameters. MWD and LWD data is transmitted to the surface through various telemetry methods, such as mud pulse, mud siren, and electromagnetic telemetry. Owing to the limited bandwidth of downhole telemetry systems, data framing (structuring the transmitted data into recognizable packets for accurate decoding and interpretation) is a critical part of effective data transmission, Generating acceptable data frames tends to be highly challenging owing to the need to meet data placement rules based on client requests, operational needs, geological conditions, and specific drilling objectives. Different drilling operations require various bottomhole assembly (BHA) tools and corresponding downhole measurements based on the operational objectives. In general, each drilling operation requires a specifically designed data frame configured to transmit the necessary drilling data to the surface. Data frame design is often an expensive undertaking, commonly requiring several hours of a drilling engineers time (e.g., up to 8 or more). Moreover, further review and approval by quality control (QC) and operation support center (OSC) personnel often increases the time investment significantly (e.g., up to and exceeding 48 hours of highly trained personnel time).

There is a need in the industry to reduce the time and cost of effective data frame generation. With the continued advancement of MWD and LWD technology, there is a further need to generate optimized data frames to improve downhole telemetry data throughput, accuracy, and reliability.

SUMMARY

Systems and methods for generating a data frame for data transmission are disclosed. One example disclosed method includes receiving a listing of the plurality of data points, each of the data points in the listing including a size and an assigned class; receiving a set of data placement rules that constrain placement of the plurality of data points in the generated data frame, the set of data placement rules including at least a frequency rule and a class rule, the frequency rule specifying frequencies at which selected ones of the plurality of data points that are subject to the frequency rule appear within the generated data frame, the class rule specifying an interval that include at least one of the plurality of data points in an assigned class that is subject to the class rule; building a mathematical model of a data frame generating problem that is constrained by each of the received data placement rules with the exception of the class rule, the mathematical model dependent upon a range of spacings of the data points that are subject to the frequency rule; and solving the mathematical model by iterating the range of spacings to generate a data frame that includes each of the plurality of data points and that satisfies each of the data placement rules with the exception of the class rule.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 5 depicts a flow chart of still another example method for generating a data frame.

FIG. 6 depicts a complex data frame generation example.

DETAILED DESCRIPTION

Example methods for generating a data frame include building a mathematical model of a data frame generating problem that is constrained by data placement rules and solving the mathematical model by iterating a range of spacings of a frequency rule to generate a data frame that satisfies each of the data placement rules.

Example embodiments disclosed herein may provide various technical advantages and improvements over the prior art. For example, the disclosed embodiments may advantageously provide automated systems and methods for optimizing data frame generation that may enhance both accuracy and efficiency. Automation tends to streamline the process and thereby save engineering time and corresponding costs. Moreover, the method may ensure that all data placement rules are met and thereby eliminate data frame quality issues that can arise due to human error. Data frames may be generated that minimize the total number of bits in the frame and thereby maximize the use of limited telemetry bandwidth. Optimal placement of data points within the frame may also ensure efficient and effective data transmission.

In further example embodiments, the disclosure may provide for joint optimization of the telemetry rate and the corresponding data frame to provide for optimized telemetry reliability and data frame generation. Moreover, certain disclosed embodiments may identify operations in which there is excess telemetry bandwidth and may enable additional data to be built into the generated data frame, thereby increasing the value of the transmitted data.

Figure 1:
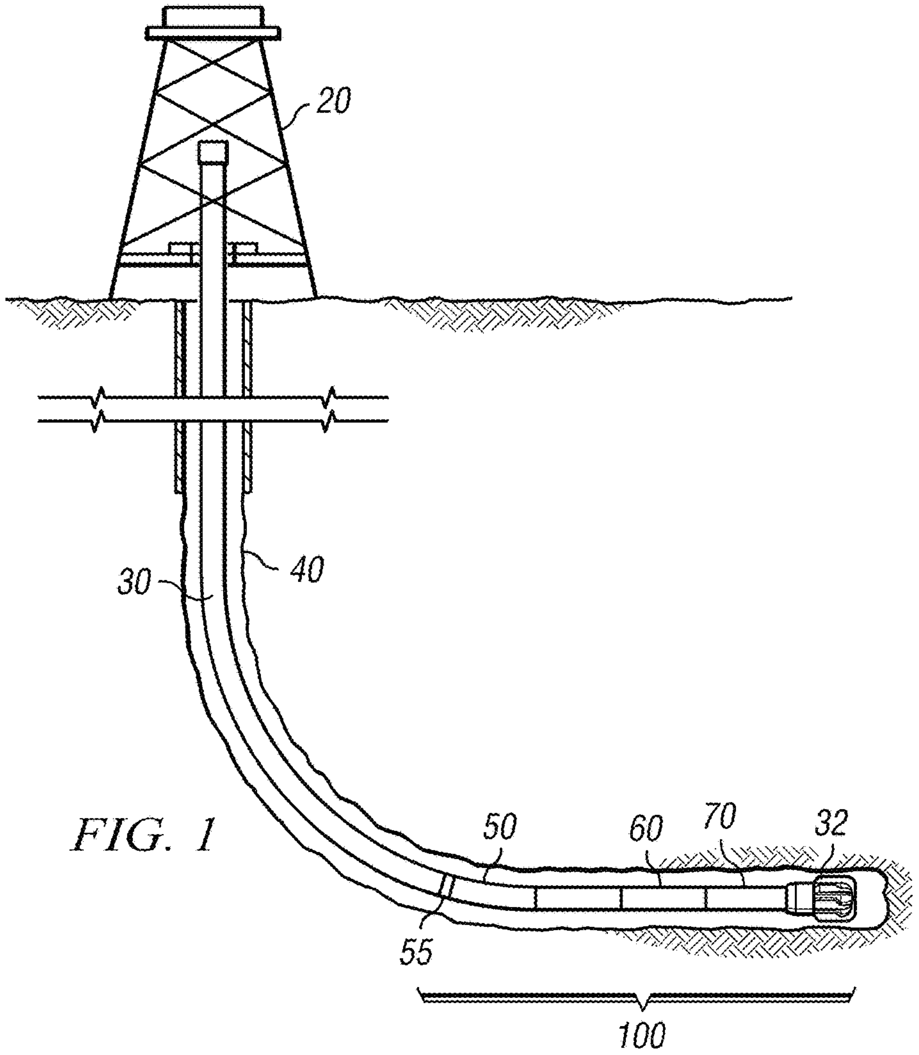
FIG. 1 depicts a drilling rig including a disclosed bottom hole assembly.

FIG. 1 depicts a drilling rig 20 including a disclosed bottom hole assembly (BHA) 100. The BHA may be configured to make various downhole measurements and to transmit selected data from among those measurements to the surface (e.g., via mud pulse, mud siren, and/or electromagnetic telemetry). In the depicted embodiment, the drilling rig 20 is positioned over a subterranean formation and may include a derrick and a hoisting apparatus (not shown) for raising and lowering a drill string 30, which, as shown, extends into wellbore 40. The depicted BHA 100 includes a drill bit 32 as well an MWD tool 50, an LWD tool 60, and a rotary steerable system (RSS) 70, each of which may include numerous data generating sensors. The BHA 100 further includes a telemetry tool 55 (e.g., located at an upper end of MWD tool 50). It will be appreciated that the disclosed embodiments are not limited to any particular BHA configuration and that the BHA 100 may further include other tools (e.g., one or more other LWD tools, a fluid sampling tool, a formation core sampling tool, etc.). The disclosed embodiments are expressly not limited in regard to the bottom hole assembly (BHA) configuration.

It will be appreciated that the above-described downhole tools commonly generate data while drilling a wellbore (e.g., during the drilling operation). Such data may include, for example, wellbore surveying data (e.g., wellbore inclination and azimuth), drill string dynamics data (e.g., shock and vibration), formation evaluation data (e.g., resistivity, gamma ray, porosity, slowness, LWD images, etc.), and wellbore environmental data (e.g., temperature and pressure). The disclosed embodiments are explicitly not limited to any particular downhole measurements or types of data generation. In example embodiments, the BHA further includes a tool bus that electronically interconnects one or more of the above tools. During a drilling operation, the MWD tool 50 may receive and aggregate data from selected tools to generate data frames that are transmitted to the surface via the telemetry system 55. The data frames are generally configured to satisfy various customer and operational demands. The disclosed embodiments advantageously make use of an automatically generated and optimized data frame. Instructions for constructing and transmitting such optimized data frames may be embedded, for example, in the MWD tool firmware or software (e.g., in electronic memory).

It will be understood by those of ordinary skill in the art that the deployment illustrated on FIG. 1 is merely an example. It will be further understood that the disclosed embodiments are not limited to an onshore deployment as depicted. The drilling rig 20 may be deployed onshore or offshore. As is further known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are expressly not limited in these regards.

While the disclosed embodiments are described in detail with respect to downhole drilling applications, it will be appreciated that the invention is not so limited. Example embodiments make use of constraint satisfaction programming to automatically generate optimal data frames and extend beyond the disclosed MWD applications in the oil and gas industry. It will be appreciated that data frames are used in numerous applications for structuring transmitted data into recognizable packets for accurate decoding and interpretation. For example, in telecommunications, data frames facilitate the transmission of digital signals over networks, ensuring reliable communication and data integrity. In manufacturing, data frames are used to encode and decode data transmitted from sensors on machinery, allowing for real-time monitoring and optimization of production processes. In automotive and aerospace systems, data frames gather and organize information from various sensors and control units, enabling efficient vehicle monitoring and diagnostics.

A data frame may be thought of as a unit of digital transmission including an ordering of data to be transmitted. For example, a simplified frame may include first, second, and third data packets each representative of a specific measurement and including a specified number of bits. Data frame generation involves arranging data points in a specific sequential order to ensure that data placement rules for each data point are met. The data points may be defined, for example, by a name, a size (in number of bits), and a category. When designing a data frame, drilling engineers typically have information about the data points and data placement rules, which may be influenced by client requests, operational needs, geological conditions, and specific drilling objectives. The engineer's task is to design a data frame that adheres to each rule. Additional constraints may include the total number of data points and the maximum number of bits in the frame. As noted above, the task of designing the data frame can be time consuming and expensive. Moreover, improper data frame generation may lead to reliability issues in data delivery, often resulting in non-compliance concerns from clients. This may sometimes necessitate a pull out of the hole (POOH) event, potentially incurring associated fines.

Figure 2A:
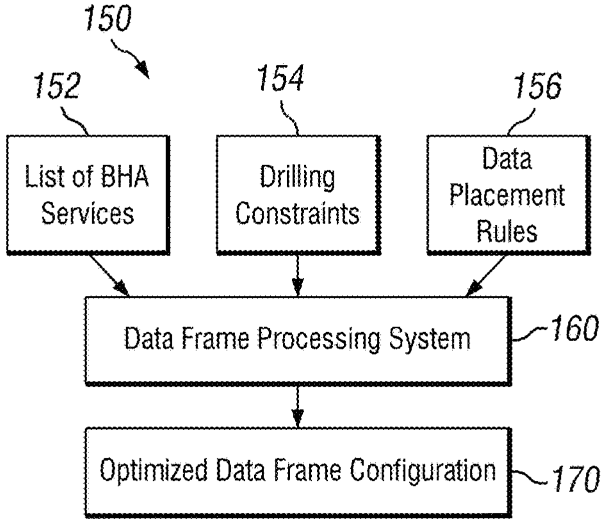
FIGS. 2A and 2B (collectively FIG. 2) depict an example system (2A) and an example method 200 (2B) for generating a data frame.
Figure 2B:
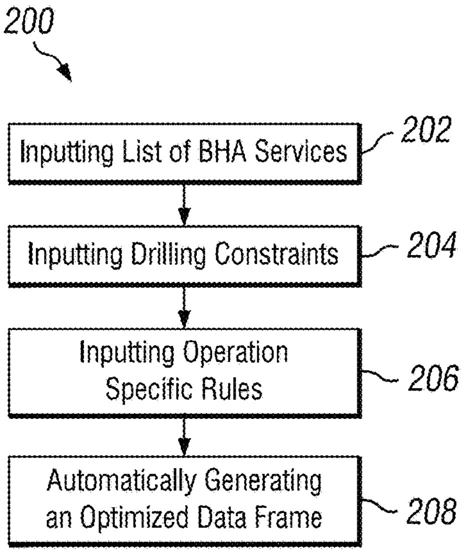

Turning now to FIGS. 2A and 2B (collectively FIG. 2), an example system 150 (2A) and an example method 200 (2B) for generating a data frame are depicted. In FIG. 2A system 150 includes a processing system 160 configured to receive a list of BHA services 152, drilling constraints 154, and a list of operation specific rules 156 and to automatically generate and output an optimized data frame 170. The processing system 160 may include substantially any suitable processing system, for example, including a laptop computer, a desktop computer, or a workstation configured to receive inputs 152, 154, 156 and to generate and output the optimized data frame 170. The processing system may include processor executable instructions stored in memory and configured to execute selected ones of the method steps described in more detail below. To perform these functions, the hardware may include one or more processors (e.g., microprocessors) which may be connected to one or more data storage devices (e.g., hard drives or solid state memory). As is known to those of ordinary skill, the processors may be further connected to a network, e.g., to receive the surveying and ranging measurements or another computer system. It will, of course, be understood that the disclosed embodiments are not limited the use of or the configuration of any particular computer hardware and/or software.

With continued reference to FIG. 2A, the list of BHA services 152 may include a listing of the measurements (the data) to be included in the generated data frame (and therefore transmitted up hole). The listing of measurements may include various downhole services including, for example, wellbore surveying, drilling dynamics, one or more LWD measurements, and the like. The listing may further include the amount of data (e.g., the number of bits) required by each of the measurements. It will be appreciated that the disclosed embodiments are not limited to any particular data type or configuration. The drilling constraints 154 may include various expected and/or targeted drilling performance attributes such as a rate of penetration (ROP) or a telemetry bit rate or bandwidth. The list of data placement rules 156 may include various rules that govern the data frame configuration. It will be appreciated that these data placement rules may be referred to in shorthand herein as simply rules. While the disclosed embodiments are not limited in this regard, the rules generally include customer driven rules (e.g., rules pertaining to specific customer requirements about data placement in the frame) and technically driven rules (e.g., rules related to various technical limitations or data placement requirements of the operation). Example rules are described in more detail below.

In FIG. 2B, method 200 includes inputting a list of BHA services 202, inputting drilling constraints 204, and inputting a list of operation specific rules 206 into a processing system (or receiving them with a processor) and automatically generating an optimized data frame based on the inputs at 208. The method may be executed, for example, at a rig site location or at a service provider location. The disclosed embodiments are not limited in this regard. Method 200 may further optionally include programming a downhole tool (such as a downhole telemetry tool and/or MWD tool) to automatically generate and transmit the optimized data frame during a drilling operation.

Figure 3:
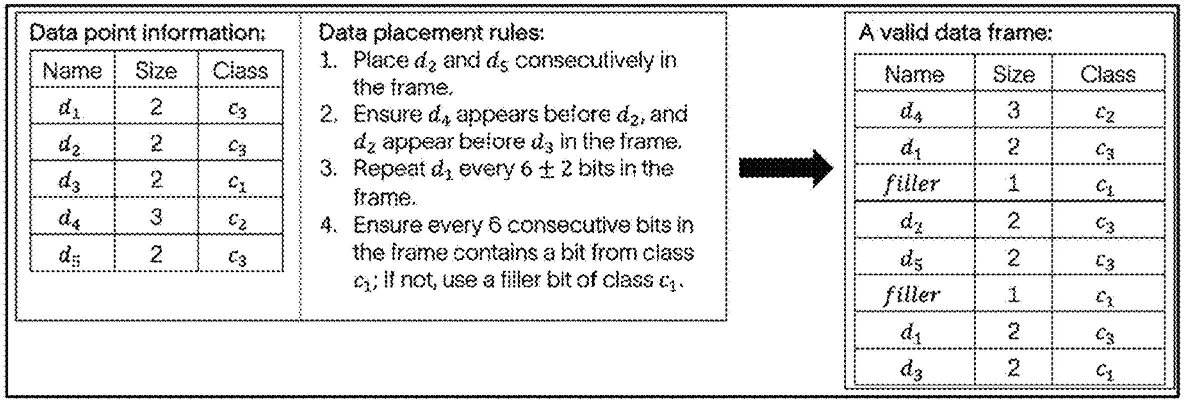
FIG. 3 depicts a simplified data frame generation example.

FIG. 3 depicts a highly simplified example of a data frame generation process. It will be appreciated that in the example embodiments that follow in this disclosure a data frame may sometimes be referred in shorthand as simply a frame. While this example shows a straightforward frame, in practice, MWD applications generally require data frames including hundreds of data points and more complex placement rules, making the data frame generating task significantly more challenging than depicted in this example. Notwithstanding, the example is included for illustrative purposes. In this example, five data packets are included $d_1$, $d_2$, $d_3$, $d_4$, and $d_5$, each including a specified size (in bits), and a class ($c_1$, $c_2$, or $c_3$). Four example data placement rules are also listed along with an example valid data frame. The generated data frame satisfies each of the data placement rules. Namely, (i) $d_2$ and $d_5$ are placed consecutively in the frame, (ii) $d_4$ appears before $d_2$, and $d_2$ appears before $d_3$, (iii) $d_1$ is repeated every 6±2 bits, and (iv) every consecutive 6 bits in the frame contains a bit from class $c_1$ (note that filler bits may be used when not possible).

In example embodiments, the list of data placement rules may include rules selected from among the following eight rules in which the first three rules may be customer driven constraints and the last five may be technically driven constraints or operationally driven constraints. The disclosed embodiments make use of a declarative algorithm that has been developed to expertly combine constraint programming, mixed-integer programming, and optimization search methods. The disclosed methods are therefore intended to generate optimal data frames that adhere to all data placement rules (such as the listing above).

1. Top Rule: Data points specified in a given list should be placed in the top section (at the beginning) of the frame.
2. Bottom Rule: Data points specified in a given list should be placed in the bottom section (at the end) of the frame.
3. Frequency Rule: A data point appears in the frame at a specified frequency interval, with the interval commonly given in distance and/or time units. The frequency may optionally have a specified tolerance range in the same units.
4. Ordering Rule: Data points in a specified sequence appear in that exact order within the frame. The sequence (order) is defined, but the data points do not need to be consecutive.
5. Ordered Group Rule: Data points in a specified group appear consecutively and in the specified order within the frame.
6. Unordered Group Rule: Data points in a specified group appear consecutively within the frame, but the order of appearance is not specified.
7. Separation Rule: Specified data points should be separated by a certain distance and/or time interval.
8. Class Rule: For a given class of data points, there should not be a maximum specified interval without a data point from a certain class or a placeholder (or filler) data point within the frame.

The foregoing rules are now described in more detail mathematically, expressing the data placement rules in a manner that may be directly implemented into software for data frame generation. Given a set of data points:

$$D = \{d_1, d_2, \ldots, d_n\}$$

where each data point (or data packet) includes a name $d_i$, a size $s_i$ and a class $c_i$. The data frame generation goal is to arrange the data points linearly (in order) such that there are no gaps between the data points in the frame, no two data points overlap, and all additional data placement rules are satisfied. To achieve these goals, a position variable and an interval variable may be defined. A position variable is an integer variable $x_i$ that represents the starting position of each data point $d_i$ in the frame:

$$x_i \in \mathbb{Z},\ 0 \le x_i \le S - s_i$$

where S represents the total size of the frame (i.e., the number of bits in the frame), which may be computed as follows:

$$S = \sum_{i=I}^{N} s_i$$

The interval variable $I_i$ defines the interval of each data point $d_i$ from the starting position of the data point $x_i$ to the ending position of the data point $x_i + s_i$ as follows:

$$I_i = [x_i, x_i + s_i)$$

As noted above, one of the goals of the data frame generation method is that no two data points overlap. This may be referred to as a non-overlap rule and is generally inherent in the method such that it is not necessarily one of the input rules. For each pair of data points ($d_i$, $d_i$) where i≠j, the non-overlap rule may be expressed, for example, as follows:

$$(x_i + s_i \le x_j) \vee (x_j + s_j \le x_i)$$

The example rules listed above may be described mathematically, for example, as follows:

The Top Rule may specify that given an ordered list of data points subject to the top rule $T=[d_{t_1}, d_{t_2}, \ldots, d_{t_k}]$, the data points should be placed at the beginning of the frame in the specified order (i.e., $d_{t_1}$ followed by $d_{t_2}$, etc.). The following constraints may be enforced in implementing the top rule during data frame generation:

First, the first data point $d_{t_1}$ in list T is placed at the start of the frame such that:

$$x_{d_{t_1}} = 0$$

where $$x_{d_{t_1}}$$

denotes the starting position of data point $d_{t_1}$.

Second, for all consecutive data points $d_{t_i}$ and $d_{t_{i+1}}$ in list T, the starting position of $d_{t_{i+1}}$ immediately follows the end of $d_{t_i}$. This may be expressed as follows:

$$x_{d_{t_{i+1}}} = x_{d_{t_i}} + s_{d_{t_i}}, \forall\, i \in \{1, \ldots, k-1\}$$

where $$x_{d_{t_i}}$$

is the starting position of data point $d_{t_i}$ and $$s_{d_{t_i}}$$

is its size.

The Bottom Rule may specify that given an ordered list of data points subject to the bottom rule $B=[d_{b_1}, d_{b_2}, \ldots, d_{b_k}]$, the data points should be placed at the end of the frame in the specified order (i.e., $d_{b_1}$ followed by $d_{b_2}$, etc.). The following constraints may be enforced in implementing the bottom rule during data frame generation:

First, the first data point $d_{b_1}$ in list B is placed at position:

$$x_{d_{b_1}} = S - \sum_{i=1}^{k} s_{d_{b_i}}$$

where $$x_{d_{b_1}}$$

denotes the starting position of data point $d_{b_1}$ and S is the total size of the frame.

Second, for all consecutive data points $d_{b_i}$ and $d_{b_{i+1}}$ in list B, the starting position of $d_{b_{i+1}}$ immediately follows the end of $d_{b_i}$. This may be expressed as follows:

$$x_{d_{b_{i+1}}} = x_{d_{b_i}} + s_{d_{b_i}}, \forall i \in \{1, \ldots, k-1\}$$

where $$x_{d_{b_i}}$$

is the starting position of data point $d_{b_i}$ and $$s_{d_{b_i}}$$

is its size.

The Frequency Rule may specify that a data point with a specified frequency appears in the data frame with the specified frequency interval (e.g., with respect to a time or depth interval). Moreover, the frequency may optionally be specified with a tolerance range including minimum and maximum temporal or depth spacing distances between the appearances of the data point. The following constraints may be enforced in implementing the frequency rule during data frame generation:

First, a mean frequency constraint specifies that each data point $d_i \in D_f$ satisfies the following:

$$n_i \geq \frac{S}{\tilde{m}_i}\ \forall d_i \in D_f$$

where $n_i$ and $\tilde{m}_i$ are decision variables, with $n_i$ representing the number of appearances of data point $d_i \in D_f$ and $\tilde{m}_i$ representing an adjusted mean frequency for data point $d_i \in D_f$, where:

$$m_i \leq \tilde{m}_i \leq m_i^{max}, \forall d_i \in D_f$$

where $$m_i^{max}$$

is a maximum allowable mean frequency.

Second, a frequency constraint specifies that each data point $d_i \in D_f$ appears within minimum and maximum spacings, for example, as follows:

$$\frac{S}{n_i} \in [l_{min,i}, l_{max,i}]\ \forall d_i \in D_f$$

where $l_{min,i}$ and $l_{max,i}$ represent the minimum and maximum spacings between appearances of data point $d_i \in D_f$ in the frame. This constraint may be advantageously reformulated using integer constraints, for example, as follows (e.g., to enable mixed-integer programming):

$$l_{min,i} \cdot n_i \leq S \leq l_{max,i} \cdot n_i\ \forall d_i \in D_f$$

Third, a total count constraint may be specified, for example, as follows:

$$z \le z_{max}$$

$$z = \sum_{i \in D} n_i$$

where z represents the total count of all data points in the frame and $z_{max}$ represents the maximum allowable total count of data points in the frame. One approach to applying the frequency rule is to minimize the deviation of the adjusted mean frequencies ($\tilde{m}_i$) from their original values ($m_i$), for example, as follows:

$$\text{Minimize} \sum_{i \in D_f} \beta_i (\tilde{m}_i - m_i)$$

where $\beta_i > 0$ represents a weight factor that penalizes deviations in mean frequencies.

The Separation Rule may specify that a pair of data points $P(d_i, d_j)$ should be separated by a minimum and maximum distance specified by $l_{min}$ and $l_{max}$. The rule may be expressed, for example, as follows:

$$l_{min} \le (x_{d_j} - x_{d_i}) \le l_{max}$$

where $x_{d_i}$ and $x_{d_j}$ represent the starting positions of corresponding data points $d_i$ and $d_j$.

The Ordering Rule may specify that data points in a specified sequence $O=[d_{o_1}, d_{o_2}, \ldots, d_{o_k}]$ appear in that exact order within the generated data frame. While the rule defines the order in which the data points appear in the frame, the data points need not be consecutive within the frame. The ordering rule may be enforced, for example, as follows:

$$x_{d_{o_{i+1}}} \ge x_{d_{o_i}} + s_{d_{o_i}}, \forall i \in \{1, \ldots, k-1\}$$

where $$x_{d_{o_i}}$$

represents the starting position of data point $d_{o_i}$ and $$s_{d_{o_i}}$$

represents its size.

The Ordered Group Rule may specify that data points in a specified group $G=\{d_{g_1}, d_{g_2}, \ldots, d_{g_k}\}$ appear consecutively within the frame and in the specified order within the frame. The ordered group rule may be enforced, for example, as follows:

$$x_{d_{g_{i+1}}} = x_{d_{g_i}} + s_{d_{g_i}}, \forall i \in \{1, \ldots, k-1\}$$

where $$x_{d_{g_i}}$$

represents the starting position of data point $d_{g_i}$ and $$s_{d_{g_i}}$$

represents its size.

The Unordered Group Rule may specify that data points in a specified group $G=\{d_{g_1}, d_{g_2}, \ldots, d_{g_k}\}$ appear consecutively within the frame, but the order of appearance is not specified. To enforce the unordered group rule, $x_{min}$ is defined as the smallest starting position of any data point in the group and $x_{max}$ is defined as the largest ending position of any data point in the group, for example, as follows:

$$x_{min} = \min_{i \in \{1, \ldots, k\}} x_{d_{g_i}}$$

$$x_{max} = \max_{i \in \{1, \ldots, k\}} (x_{d_{g_i}} + s_{d_{g_i}})$$

The unordered group rule requires that there are no gaps between the data points in the group. This may be achieved, for example, as follows:

$$x_{max} - x_{min} = \sum_{i=i}^{k} s_{d_{g_i}}$$

where $$s_{d_{g_i}}$$

represents the size of data point $d_{g_i}$.

The Class Rule may specify that for a given class of data points $C=\{c_1, c_2, \ldots, c_m\}$, there should not be a maximum specified interval $W_{max,j}$ without a data point from class $c_j$ or a placeholder or filler data point within the frame. To enforce the class rule, a set of datapoints belonging to class $c_j$ may be defined as $D_{c_j} \subseteq D$, such that:

$$D_{c_j} = \{d \in D : \text{class}(d) = c_j\}$$

For any consecutive subset $\{d_1, d_2, \ldots, d_k\} \subseteq D_{c_j}$, the following condition holds:

$$\sum_{t=1}^{k} s_t \le W_{max,j}, \forall t \in \{1, \ldots, k-1\}$$

where $s_t$ represents the size of data point $d_t$ in the consecutive subset.

With reference again to FIG. 2, the operation specific rules 156, 206 may include one or more of the foregoing rules, with drilling operations generally including most or all of these rules. One aspect of the disclosed embodiments was the realization that enforcing the frequency rule (and the corresponding class rule) is often of significant importance to the driller or customer and the most (or among the most) difficult to satisfy in generating a suitable frame. One particularly acute challenge in automatically determining an optimal frame that meets the foregoing rules via solving the above mathematical description of the data framing problem is that the minimum and maximum spacings $l_{min,i}$ and $l_{max,i}$ to satisfy the frequency rule are generally unknown. Moreover, the minimum number of placeholder data points $n_p$ that satisfy the class rule may also be unknown.

The disclosed embodiments include the following two disclosed methods for solving the foregoing data framing problem. The first approach involves treating $l_{min,i}$, $l_{max,i}$, and $n_p$ as parameters and using an optimized search method to find the best values of these parameters that build an optimized data frame. This first approach is described in more detail below with respect to FIG. 4. The second approach defines $l_{min,i}$, $l_{max,i}$, and $n_p$ decision variables that may be optimized. A unified model may be built and solved using a constraint programming method with an objective function defined appropriately as a function of $l_{min,i}$, $l_{max,i}$, and $n_p$. This second approach is more computationally expensive than the first approach and is described in more detail below with respect to FIG. 5.

Figure 4A:
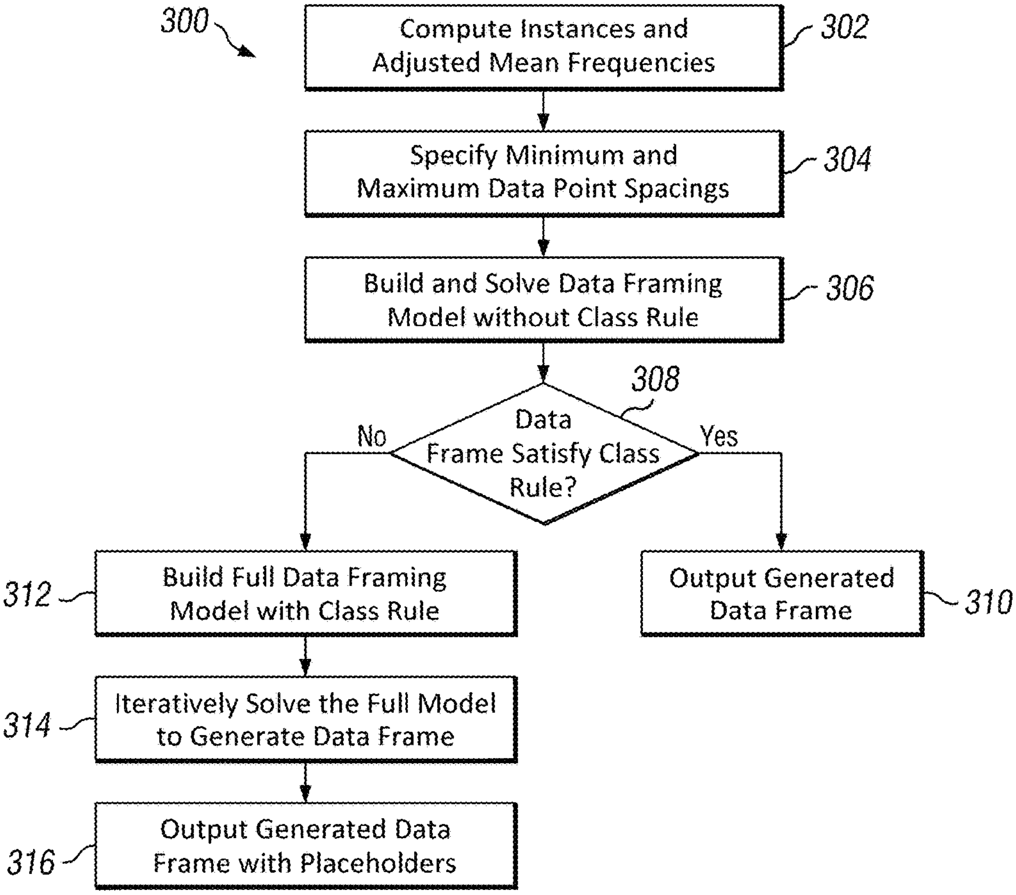
FIGS. 4A and 4B (collectively FIG. 4) depict flow charts of other example methods for generating a data frame.
Figure 4B:
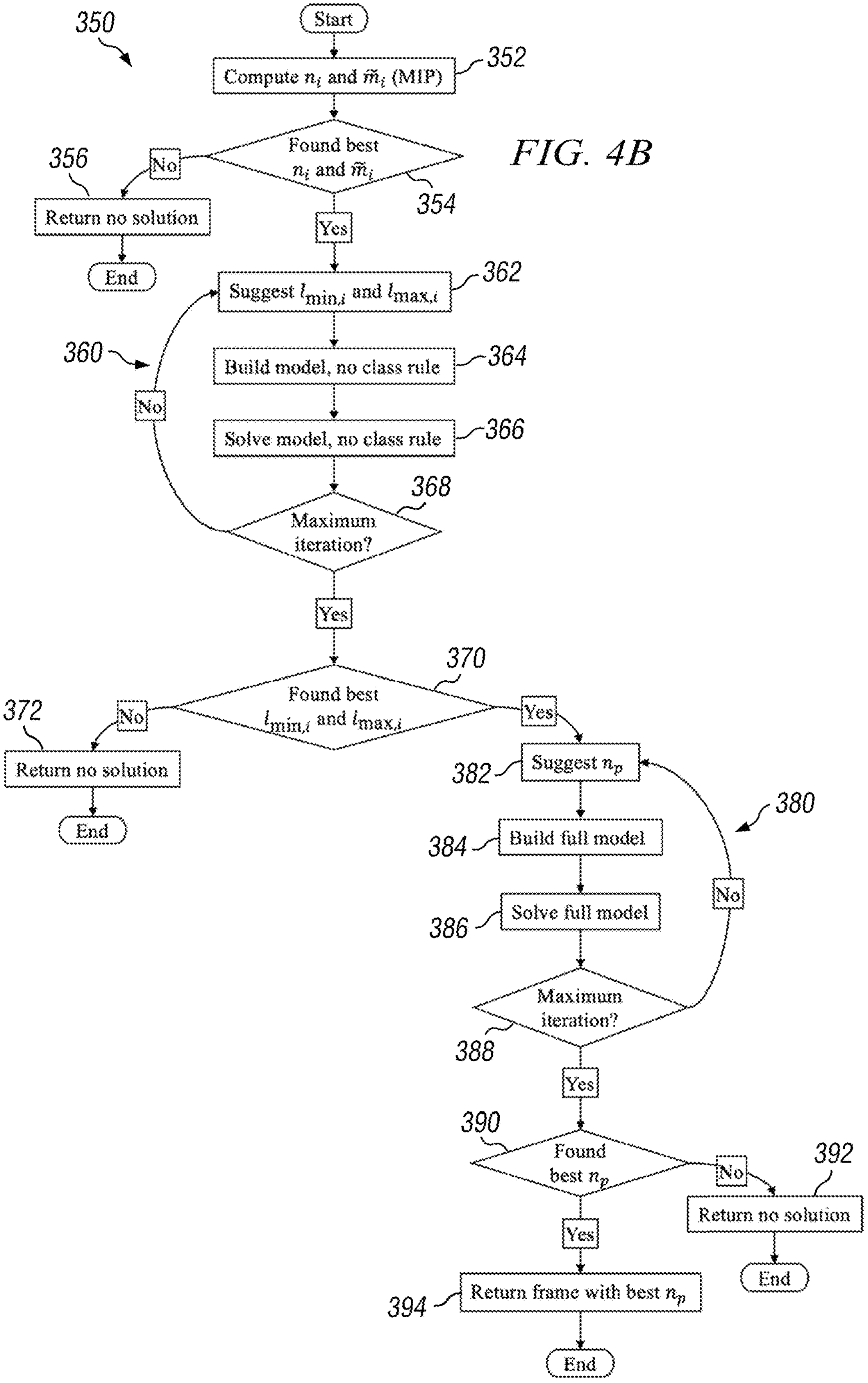

Turning now to FIGS. 4A and 4B (collectively FIG. 4), flow charts of first methods 300, 350 for generating an optimized data frame is depicted. These first methods for solving the data framing problem advantageously subdivide the problem into sub-units (or sub-problems). In FIG. 4A, method 300 includes computing at 302 the number of instances $n_i$ and adjusted mean frequencies $\tilde{m}_i$ for data points subject to frequency rules, for example, by minimizing $\Sigma_{i \in D_f} \beta_i(\tilde{m}_i - m_i)$ as described above. At 304, minimum and maximum spacings $l_{min,i}$ and $l_{max,i}$ between the data points with frequency rules are specified such that the data points and the spacings are paired. A model of the data framing problem that includes all of the rules except the class rule is built and solved at 306 using constraint satisfaction programming by searching for the maximum value of $l_{min,i}$ and minimum value of $l_{max,i}$ that provides a solution that satisfies the rules.

The data frame obtained at 306 may be evaluated at 308 to determine whether or not it satisfies the class rule. When the obtained data frame satisfies the class rule at 308, it may be output at 310. When the obtained data frame does not satisfy the class rule, a full model of the data framing problem is built at 312 that includes all of the rules including the class rule and the paired instances of data points with frequency rules, using the optimal $l_{min,i}$ and $l_{max,i}$ values calculated at 304. The full model may be iteratively solved at 314 to find the minimum number of placeholders data points $n_p$ needed to generate the data frame. A data frame including the placeholders data points is output at 316.

In FIG. 4B, method 350 is similar to method 300 in the number of instances $n_i$ and adjusted mean frequencies $\tilde{m}_i$ for data points subject to frequency rules are computed at 352, for example, by minimizing $\Sigma_{i \in D_f} \beta_i(\tilde{m}_i - m_i)$ as described above. The number of instances $n_i$ and adjusted mean frequencies $\tilde{m}_i$ may advantageously be computed independently without considering any other rules. In advantageous embodiments, the computing at 302 employs mixed-integer programming such that $n_i$ and $\tilde{m}_i$ are integer values. The computed $n_i$ and $\tilde{m}_i$ may be evaluated at 354 to determine whether or not optimal (or at least satisfactory) values were obtained. For example, the $n_i$ and $\tilde{m}_i$ may be evaluated against a total count constraint as described above with respect to the frequency rule to determine whether or not a generated frame is within a predetermined size constraint, i.e., $z = \Sigma_{i \in D} n_i \leq z_{max}$. The user may be prompted that there is no solution at 356 (and to adjust various constraints) when $n_i$ and $\tilde{m}_i$ do not satisfy the total count constraint.

When $n_i$ and $\tilde{m}_i$ satisfy the total count constraint, method 350 proceeds to a first iterative loop 360 at which minimum and maximum spacings $l_{min,i}$ and $l_{max,i}$ between the data points with frequency rules are specified. The loop may include suggesting and iterating for the maximum value of $l_{min,i}$ and minimum value of $l_{max,i}$ at 362, building a mathematical model of the data framing problem that satisfies all of the rules except the class rule at 364, and solving the model to generate a data frame at 366. As noted above, the model of the data framing problem that is built and solved at 364, 366 may use constraint satisfaction programming by shuffling or adjusting bits in the generated data frame to maximize the number of constraints or rules that are satisfied. After a number of iterations 368 (e.g., a predetermined number), the generated data frame may be evaluated to determine whether or not optimal or satisfactory $l_{min,i}$ and $l_{max,i}$ values were obtained at 370. The $l_{min,i}$ and $l_{max,i}$ values may be determined to be satisfactory when each of the rules (including the frequency rule and excluding the class rule) are satisfied. The user may be prompted that there is no solution at 372 (and to adjust various constraints and/or rules) when $l_{min,i}$ and $l_{max,i}$ are not satisfactory.

With continued reference to FIG. 4B, method 350 proceeds to a second iterative loop 380 in which the minimum number of placeholders data points $n_p$ needed to generate the data frame is determined. The loop may include suggesting and iterating for the minimum value of maximum value $n_p$ needed to generate the data frame at 382, building a mathematical model of the data framing problem that satisfies all of the rules (including the class rule) at 384, and solving the full model to generate a data frame at 386. It will be appreciated that the model built at 384 makes use of the satisfactory $l_{min,i}$ and $l_{max,i}$ values determined in loop 360. As noted above, the model of the data framing problem that is built and solved at 384, 386 may use constraint satisfaction programming by shuffling or adjusting bits in the generated data frame to maximize the number of constraints or rules that are satisfied. After a number of iterations 388 (e.g., a predetermined number), the generated data frame may be evaluated to determine whether or not an optimal or satisfactory $n_p$ value was obtained at 390. The $n_p$ value may be determined to be satisfactory when each of the rules (including the frequency rule and the class rule) are satisfied and when the number of bits in the frame is less than or equal to the prespecified maximum frame size. The user may be prompted that there is no solution at 392 (and to adjust various constraints and/or rules) when $n_p$ are not satisfactory. Otherwise, the optimal data frame is returned (output) to the user at 394.

In example embodiments, methods 300 and 350 may be initialized by reusing a data frame that was generated (either manually or automatically) for a previous operation. For example, in such embodiments, the $n_i$, $\tilde{m}_i$, $l_{min,i}$ and $l_{max,i}$ values may be initially set to those from the previously generated frame. Such initialization may advantageously accelerate the subsequent iteration and may enable other data frame requirements that are not included by the set of predefined rules to be considered. In another example, the positions of the data points in the previous data frame may be taken as initial positions and may be used to constrain the solver and generating subsequent positions to speed up frame generation.

Turning now to FIG. 5, a flowchart of method 400 is depicted. Method 400 includes building a full mathematical model of the data framing problem at 402. The model may define $n_p$, $l_{min,i}$ and $l_{max,i}$ as decision variables to be optimized and thereby enable an objective function to be defined appropriately as a function of each of these variables. The full mathematical model may be solved at 404 to generate the data frame. The computed frame may be output to the end user at 410 when a solution to the full model is found at 406. Otherwise, the user may be prompted at 408 that no solution has been found (e.g., within a prescribed time or number of iterations) and that the rules and/or constraints may need to be modified.

It will be appreciated that the full mathematical model including the frequency rule, the class rule, and each of the other rules may be highly complex (depending upon the complexity and severity of the constraints within the rules). It will be further appreciated that solving such a highly complex model may be computationally expensive and time-consuming and that an adequate solution (optimal data frame) may not be found. It will still further be appreciated that advanced processing methods, such as quantum computing, machine learning and/or artificial intelligence, may be employed to solve the full model.

FIG. 6 depicts a more complex example of a data frame generation process for illustrative purposes. The disclosed embodiments are, of course, not limited by this example. In this example, sixteen data packets are included $d_1, d_2, \ldots d_{16}$, each including a specified size (in bits), and a class ($c_1$, $c_2$, or $c_3$). Seven example data placement rules are also listed along with an example valid data frame on the right-hand side of the figure. The generated data frame satisfies each of the data placement rules as follows: For rule 1: $d_{16}$ and $d_{13}$ are placed consecutively at the top of the frame. For rule 2: $d_{14}$ and $d_{10}$ are placed consecutively at the bottom of the frame. For rule 3: all repeated instances of $d_5$ and $d_7$ appear consecutively within the frame. For rule 4: $d_{15}$, $d_3$, and $d_{12}$ are ordered within the frame such that $d_{15}$ appears before $d_3$ which in turn appears before $d_{12}$. For rule 5: $d_4$ and $d_9$ and $d_{11}$ and $d_3$ are appropriately separated such that $S_2=x_9-x_4=27$ satisfies $26\leq S_1\leq 30$ and $S_2=x_3-x_{11}=9$ satisfies $8\leq S_2\leq 12$ where $x_i$ is taken from the Starting Position column in the valid data frame table. For rule 6: $d_5$, $d_7$, and $d_8$ appear at the appropriate frequencies. The frequency between repeated instances of data points with frequency rules is shown in the Frequency Spacing column in the valid data frame table. The frequency spacings for $d_5$ and $d_7$ are 15, 18, 21, and 18, which satisfies $14\leq F_1\leq 22$. The frequency spacings for $d_8$ is consistently 24, which satisfies $24\leq F_2\leq 30$. For rule 7: datapoints $d_1$, $d_3$, $d_4$, $d_{10}$, $d_{15}$, and $d_{16}$ obey the class rule for class $c_1$ that $W_{max,j}=7$. Every consecutive 7 bits in the frame contains a bit from class $c_1$ data point. When this is not possible, class $c_1$ filler bits are used.

It will be appreciated that the telemetry speed (the transmitted bit rate) has a direct impact on the success of the search algorithms employed in FIGS. 4 and 5. It will be further appreciated that the constraints within the frequency rule are directly related to the telemetry speed. For example, a six bit per second telemetry speed imposes half of the timing constraints as compared to a three bit per second telemetry speed. Those of ordinary skill will readily appreciate that owing to the large range of operational conditions and BHA configurations, the telemetry speed may vary over a wide range, for example, from about 1 bit per second to about 24 bits per second.

In conventional drilling operations the selection of the telemetry speed is made independently of the data frame generation. For example, selection of the telemetry speed is often made before the data frame generation and constrains the data frame generation process. Selecting an optimum telemetry speed for a particular drilling operation can significantly impact the success and profitability of the drilling operation. Selecting a telemetry speed that is too high can negatively impact the telemetry liability and cause significant non-productive time. On the other hand, selecting a conservative telemetry speed that is too low (or to conservative) may slow the drilling process to accommodate the low telemetry speed or significantly reduce the amount of data available at the surface. One aspect of the disclosed embodiments was the realization that the telemetry speed and the generated data frame may be advantageously jointly optimized.

Figure 7:
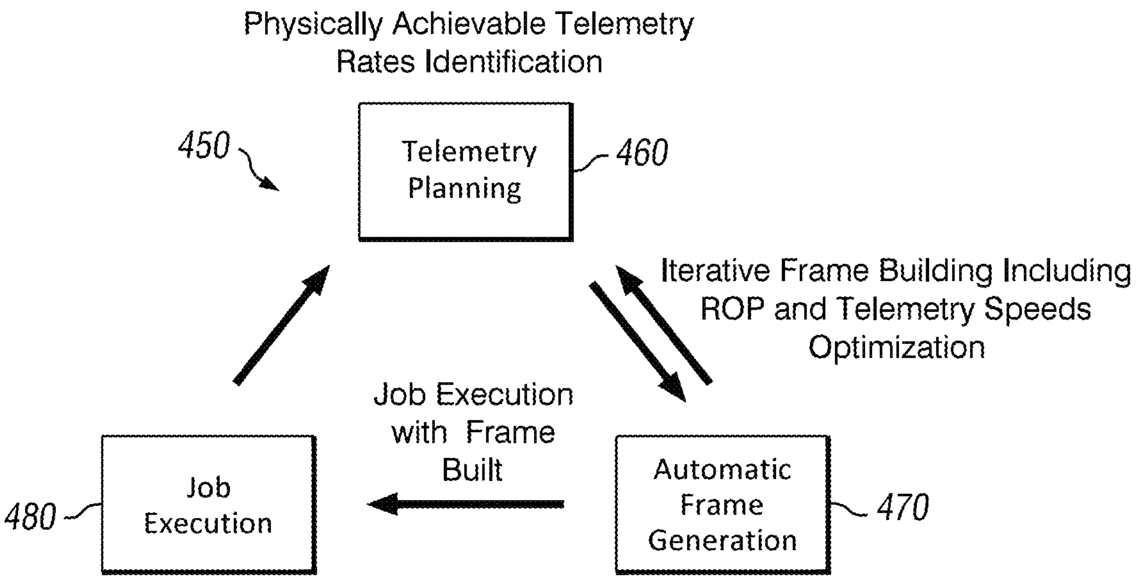
FIG. 7 schematically depicts an automated method for jointly optimizing telemetry speed selection and data frame generation.

FIG. 7 schematically depicts an automated method 450 for jointly optimizing the telemetry speed selection and the data frame generation. The automated frame builder enables an iterative optimization of the data frames and telemetry speed. The telemetry planning module 460 may suggest multiple (e.g., at least first, second, and third or at least first, second, third, and fourth) achievable telemetry speeds within predicted safety margins for the drilling operation. These telemetry speeds may range from conservative lowest telemetry speed to a more ambitious highest telemetry speed. The frame generation module 470 is configured to start with the lowest (i.e., most conservative) of the suggested telemetry speeds. If a generated data frame satisfies all of the input rules, then the lowest telemetry speed and the corresponding optimized data frame may be used during drilling as indicated by job execution block 480. If a data frame cannot be generated to satisfy all of the input rules using the lowest telemetry speed, the frame automation process is implemented again with a higher telemetry speed (the next most conservative telemetry speed). This iterative process continues until an appropriate data frame and telemetry speed is found. If no data frame can be found the user may be suggested to decrease the rate of penetration of the job, remove data points from the list of BHA services, or relax the input constraints (rules), such as one of the frequency rules.

Figure 8:
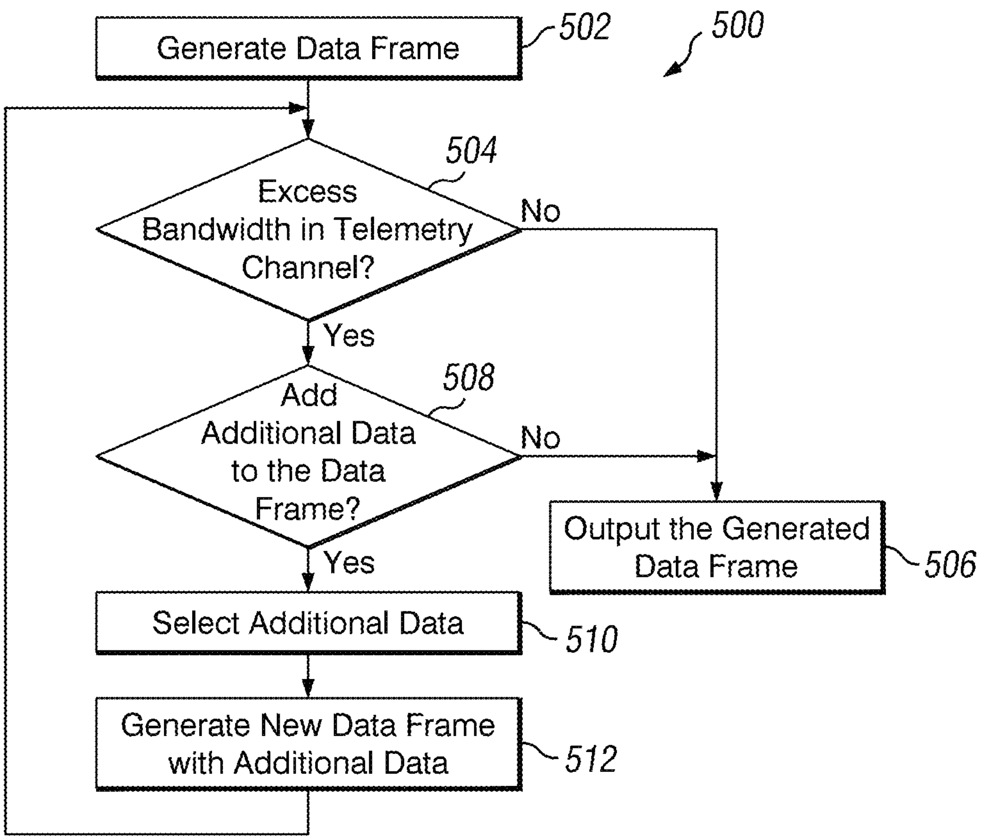
FIG. 8 depicts a flow chart of yet another example method for generating a data frame.

FIG. 8 depicts a flow chart of another disclosed method 500. A data frame is generated at 502, for example using one of the methods described above with respect to FIGS. 4 and 5. The data frame is further evaluated at 504 to determine whether or not there is excess bandwidth (e.g., excess above a threshold) within the telemetry channel. When there is no excess bandwidth the data frame may be accepted and output at 506. When there is excess bandwidth (e.g., indicating that additional data may be transmitted) a user may be prompted to increase data transmission at 508. When the user declines to add additional data, the data frame may be accepted at 506. Otherwise, the user may select additional data points to the data frame or to increase the bit size of certain data points at 510. For example, optional drilling dynamics data or other optional data points may be added to the list of services. In another example, the bit budget of selected data points, such as MWD or LWD images, may be increased thereby leading to higher fidelity images. A new data frame including the increased data may be generated and output to the user at 512. The method may then return to 504 to again evaluate whether or not there is excess bandwidth (even after adding the increased data).

Although automated and optimized data frame generation and certain advantages thereof have been described in detail, it should be understood that various changes, substitutions and alterations may be made herein without departing from the spirit and scope of the disclosure.

The invention claimed is:

1. A method for automatically generating a data frame for data transmission in a drilling operation, the data frame including a plurality of data points, the method comprising:

receiving a listing of the plurality of data points, each of the data points in the listing including a size and an assigned class;

receiving a set of data placement rules that constrain placement of the plurality of data points in the data frame to be generated, the set of data placement rules including at least a frequency rule and a class rule, the frequency rule specifying frequencies at which selected ones of the plurality of data points that are subject to the frequency rule appear within the data frame to be generated, the class rule specifying an interval that includes at least one of the plurality of data points in an assigned class that is subject to the class rule, wherein the data placement rules correspond to technical specifications of one or more components of the drilling operation, customer requests regarding data placement within the data frame to be generated, or a combination thereof;

building a mathematical model of a data frame generating problem that is constrained by each of the received data placement rules with the exception of the class rule, the mathematical model dependent upon a range of spacings of the data points that are subject to the frequency rule;

solving the mathematical model by iterating the range of spacings;

generating the data frame based on the solved mathematical model, wherein the data frame includes each of the plurality of data points and satisfies each of the data placement rules with the exception of the class rule; and causing one or more downhole tools of the drilling operation to transmit the data frame during the drilling operation.

2. The method of claim 1, wherein the plurality of data points correspond to data generated while drilling a wellbore, the generated data including at least one of measurement while drilling data or logging while drilling data.

3. The method of claim 1, wherein the data transmission comprises downhole telemetry and the method further comprises receiving drilling constraints including at least a rate of penetration while drilling and a downhole telemetry bit rate.

4. The method of claim 1, wherein the building and the solving utilize constraint satisfaction programming.

5. The method of claim 1, wherein the building the mathematical model further comprises:

computing a number of instances and adjusted mean frequencies for data points that are subject to the frequency rule; and building the mathematical model of the data frame generating problem using the computed number of instances and the computed adjusted mean frequencies.

6. The method of claim 5, wherein the number of instances and the adjusted mean frequencies are computed using mixed-integer programming.

7. The method of claim 1, wherein the range of spacings comprises a maximum value of a minimum spacing of the data points that are subject to the frequency rule and a minimum value of a maximum spacing of the data points that are subject to the frequency rule.

8. The method of claim 1, further comprising:

building a full mathematical model of a data frame generating problem that is constrained by each of the received data placement rules including the class rule, the full mathematical model dependent upon a minimum number of placeholder bits that are needed to generate a data frame that satisfies the class rule; and solving the full mathematical model by iterating the minimum number of placeholder bits to generate the data frame that includes each of the plurality of data points and that satisfies each of the data placement rules including the class rule.

9. The method of claim 8, wherein the building the full mathematical model and the solving the full mathematical model utilize constraint satisfaction programming.

10. The method of claim 1, wherein the set of data placement rules comprises a plurality of additional data placement rules selected from the following listing of data placement rules: (i) a top rule that specifies that subject data points be placed at a beginning of the data frame to be generated, (ii) a bottom rule that specifies that subject data points be placed at an end of the data frame to be generated, (iii) an ordering rule that specifies subject data points in a specified order with the data frame to be generated, (iv) an ordered group rule that specifies that subject data points appear consecutively and in a specified group order within the data frame to be generated, (v) an unordered group rule that specifies that subject data points appear consecutively but in an unspecified order in the data frame to be generated, and (vi) a separation rule that specifies that subject data points be separated by a certain distance or time interval in the data frame to be generated.

11. The method of claim 1, further comprising:

evaluating the data frame to determine whether or not a selected downhole telemetry channel has excess bandwidth;

accepting the data frame when the evaluating the data frame determines that the downhole telemetry channel does not have excess bandwidth;

selecting additional data for the data transmission when the evaluating determines that the downhole telemetry channel has excess bandwidth; and repeating the building and the solving to generate an updated data frame configured to incorporate the additional data.

12. The method of claim 11, wherein the additional data comprises additional data points added to the plurality of data points, selected ones of the plurality of data points having an increased size, or a combination thereof.

13. The method of claim 1, wherein the plurality of data points comprises data generated by the one or more downhole tools during the drilling operation, wherein the data comprises wellbore surveying data, drill string dynamics data, formation evaluation data, wellbore environmental data, or a combination thereof.

14. A system for automatically generating a data frame for data transmission in a drilling operation, the data frame including a plurality of data points, the system comprising:

one or more processors; and memory, accessible by the one or more processors, and storing instructions that, when executed by the one or more processors, cause the one or more processors to perform operations comprising:

receive a listing of the plurality of data points, each of the data points in the listing including a size and an assigned class;

receive a set of data placement rules that constrain placement of the plurality of data points in the data frame to be generated, the set of data placement rules including at least a frequency rule and a class rule, the frequency rule specifying frequencies at which selected ones of the plurality of data points that are subject to the frequency rule appear within the data frame to be generated, the class rule specifying an interval that includes at least one of the plurality of data points in an assigned class that is subject to the class rule, wherein the data placement rules correspond to technical specifications of one or more components of the drilling operation, customer requests regarding data placement within the data frame to be generated, or a combination thereof;

build a mathematical model of a data frame generating problem that is constrained by each of the received data placement rules with the exception of the class rule, the mathematical model dependent upon a range of spacings of the data points that are subject to the frequency rule;

solve the mathematical model by iterating the range of spacings;

generate the data frame based on the solved mathematical model, wherein the data frame includes each of the plurality of data points and satisfies each of the data placement rules with the exception of the class rule; and cause one or more downhole tools of the drilling operation to transmit the data frame during the drilling operation.

15. The system of claim 14, wherein building the mathematical model further comprises:

compute a number of instances and adjusted mean frequencies for data points that are subject to the frequency rule; and build the mathematical model of the data frame generating problem using the computed number of instances and the computed adjusted mean frequencies.

16. The system of claim 14, wherein the instructions further comprise:

build a full mathematical model of a data frame generating problem that is constrained by each of the received data placement rules including the class rule, the full mathematical model dependent upon a minimum number of placeholder bits that are needed to generate a data frame that satisfies the class rule; and solve the full mathematical model by iterating the minimum number of placeholder bits to generate the data frame that includes each of the plurality of data points and that satisfies each of the data placement rules including the class rule.

17. The system of claim 14, wherein the set of data placement rules comprises a plurality of additional data placement rules selected from the following listing of data placement rules: (i) a top rule that specifies that subject data points be placed at a beginning of the data frame to be generated, (ii) a bottom rule that specifies that subject data points be placed at an end of the data frame to be generated, (iii) an ordering rule that specifies subject data points in a specified order with the data frame to be generated, (iv) an ordered group rule that specifies that subject data points appear consecutively and in a specified group order within the data frame to be generated, (v) an unordered group rule that specifies that subject data points appear consecutively but in an unspecified order in the data frame to be generated, and (vi) a separation rule that specifies that subject data points be separated by a certain distance or time interval in the data frame to be generated.

* * * * *